United States Patent
Cogley

(10) Patent No.: US 9,155,602 B1
(45) Date of Patent: Oct. 13, 2015

(54) WINDOWED MUZZLE SYSTEM

(71) Applicant: Thomas Paul Cogley, Pinellas Park, FL (US)

(72) Inventor: Thomas Paul Cogley, Pinellas Park, FL (US)

( * ) Notice: Subject to any disclaimer, the term of this patent is extended or adjusted under 35 U.S.C. 154(b) by 89 days.

(21) Appl. No.: 14/052,729

(22) Filed: Oct. 12, 2013

Related U.S. Application Data

(63) Continuation-in-part of application No. 13/894,772, filed on May 15, 2013, now Pat. No. 9,021,991.

(51) Int. Cl.
*A01K 25/00* (2006.01)
*A01K 15/04* (2006.01)
*A61D 3/00* (2006.01)

(52) U.S. Cl.
CPC .. *A61D 3/00* (2013.01); *A01K 25/00* (2013.01)

(58) Field of Classification Search
USPC .................. 119/831, 832, 823; 54/80.1, 80.3; 128/846, 857–859; 2/9, 206
IPC .................... A01K 15/00,15/04, 25/00
See application file for complete search history.

(56) References Cited

U.S. PATENT DOCUMENTS

| | | | | | |
|---|---|---|---|---|---|
| 729,592 | A | * | 6/1903 | James | 119/823 |
| 1,455,445 | A | * | 5/1923 | Miner | 119/831 |
| 1,748,027 | A | * | 2/1930 | Rasmussen | 119/831 |
| 2,507,212 | A | * | 5/1950 | Masbruch | 119/823 |
| 3,173,401 | A | * | 3/1965 | Lupo, Sr. | 119/831 |
| 4,160,428 | A | * | 7/1979 | Wilkinson | 119/831 |
| 4,252,086 | A | * | 2/1981 | Schenck | 119/831 |
| 4,519,187 | A | * | 5/1985 | Reynolds | 54/80.3 |
| 4,603,659 | A | * | 8/1986 | Helphrey | 119/831 |
| 5,218,929 | A | * | 6/1993 | Michunovich | 119/832 |
| 5,299,531 | A | * | 4/1994 | Dietz | 119/832 |
| 6,164,246 | A | * | 12/2000 | Naftaly et al. | 119/720 |
| 6,269,489 | B1 | * | 8/2001 | Heath | 2/173 |
| 7,523,720 | B1 | * | 4/2009 | Lecy et al. | 119/832 |
| 7,802,572 | B2 | * | 9/2010 | Hahne | 128/206.19 |
| 2010/0175636 | A1 | * | 7/2010 | Slank | 119/831 |

* cited by examiner

*Primary Examiner* — Shadi Baniani

(57) ABSTRACT

A muzzle formed of a flexible sheet has a top, a bottom, and laterally spaced sides. A central hole in the muzzle is equally spaced from the sides, closer to the bottom than to the top. Two laterally spaced side holes are in the muzzle between the central hole and the sides. A restraint in a generally rectangular configuration has opposed free ends. Fasteners are secured to the restraint adjacent to the free ends. Attachment elements couple the muzzle and the restraint.

1 Claim, 3 Drawing Sheets

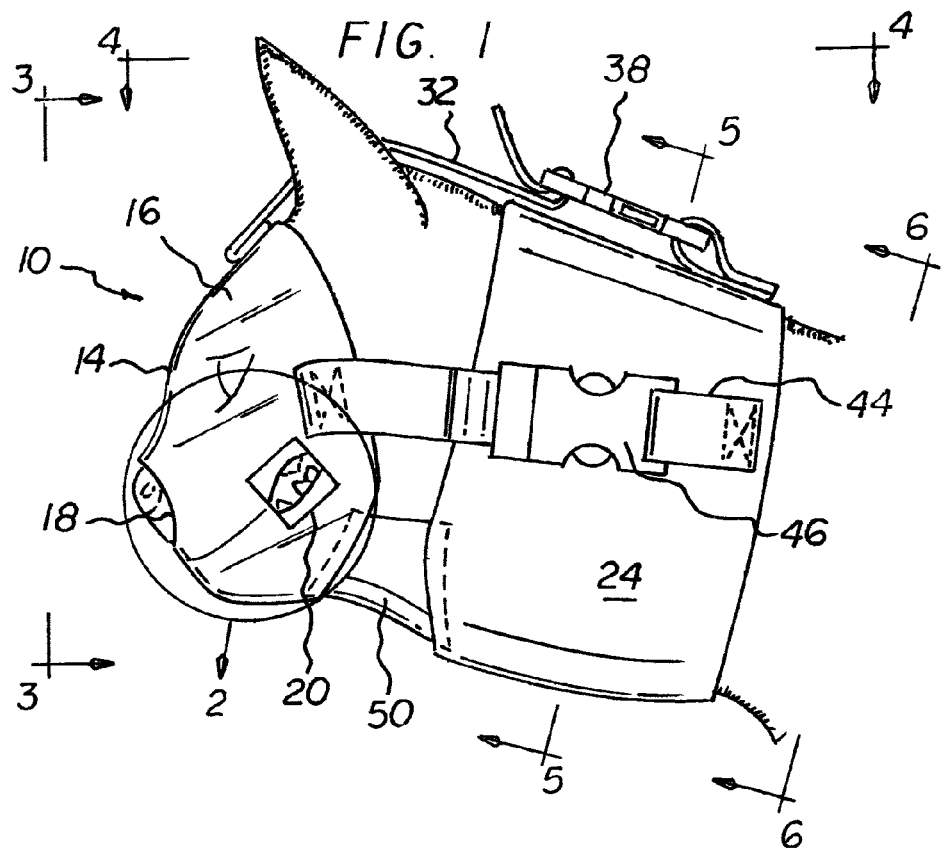
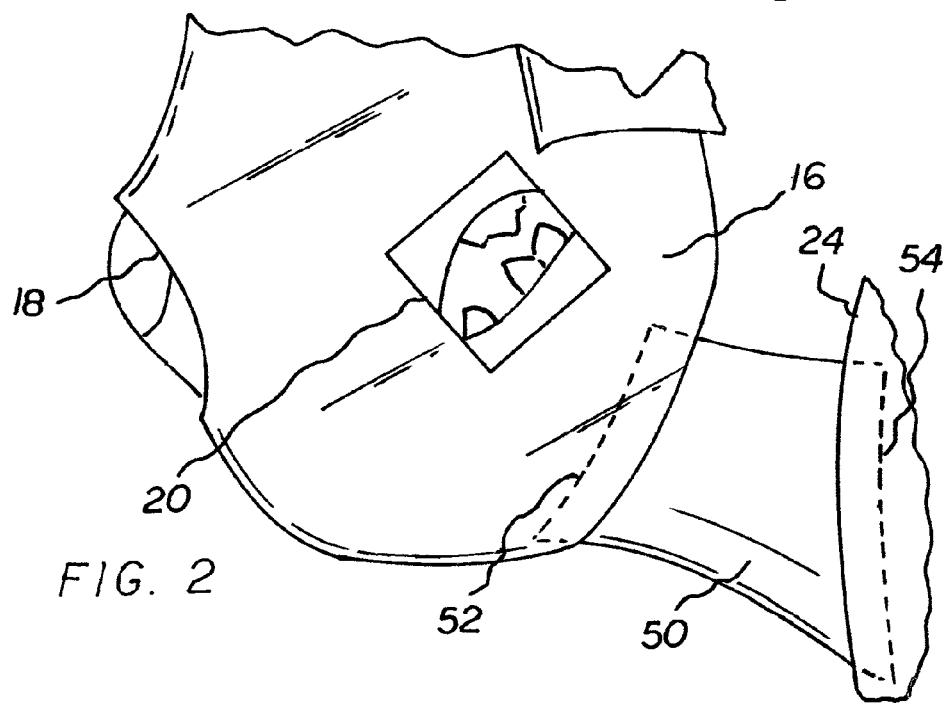

FIG. 3
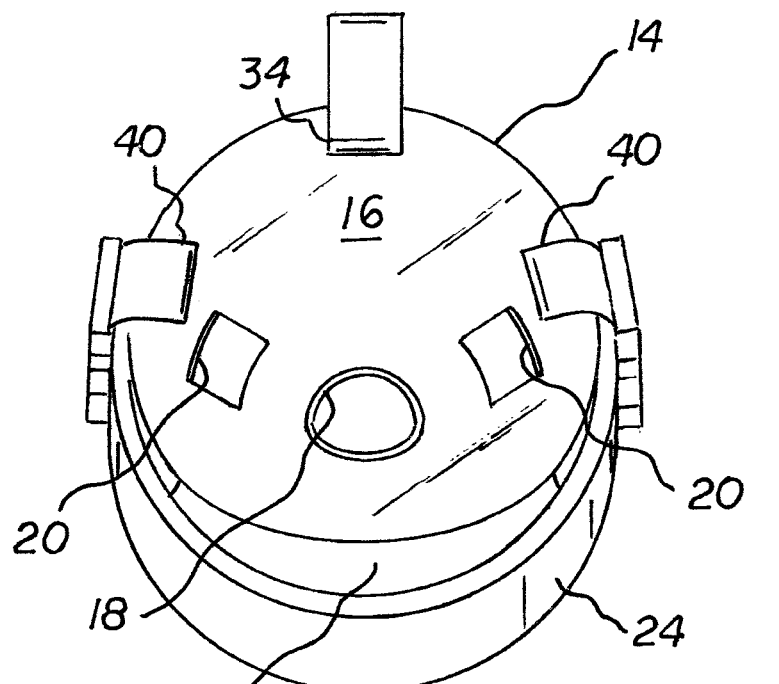
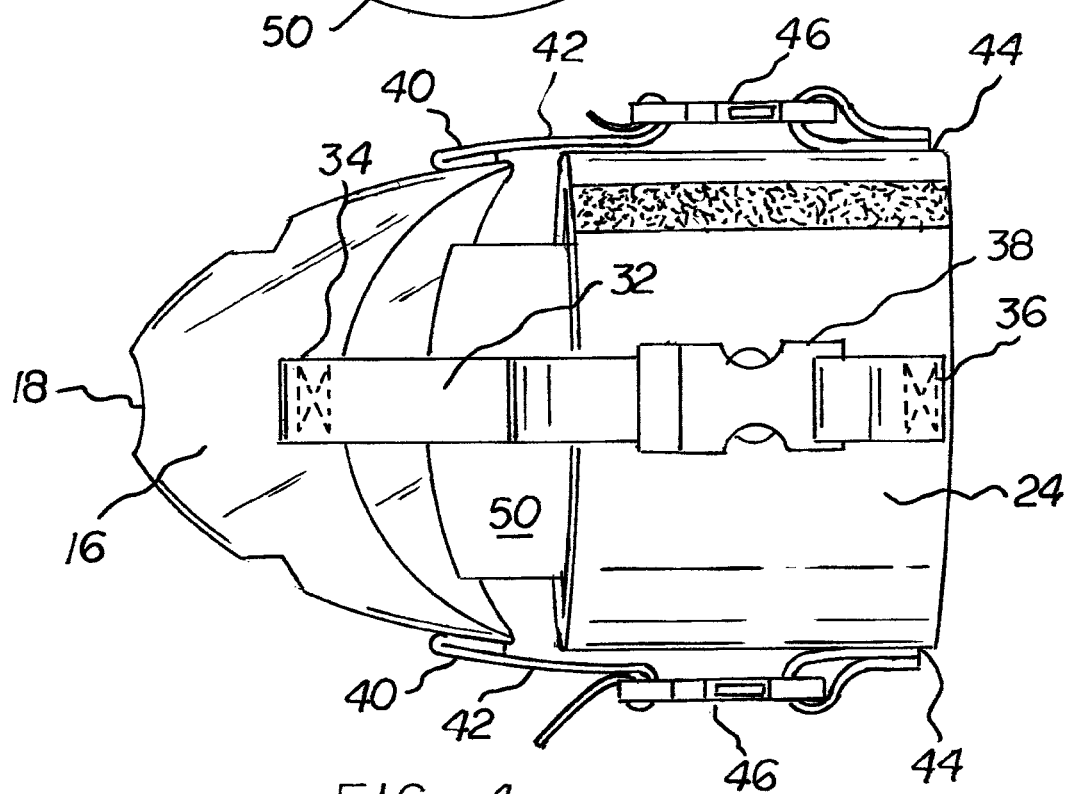
FIG. 4

FIG. 5
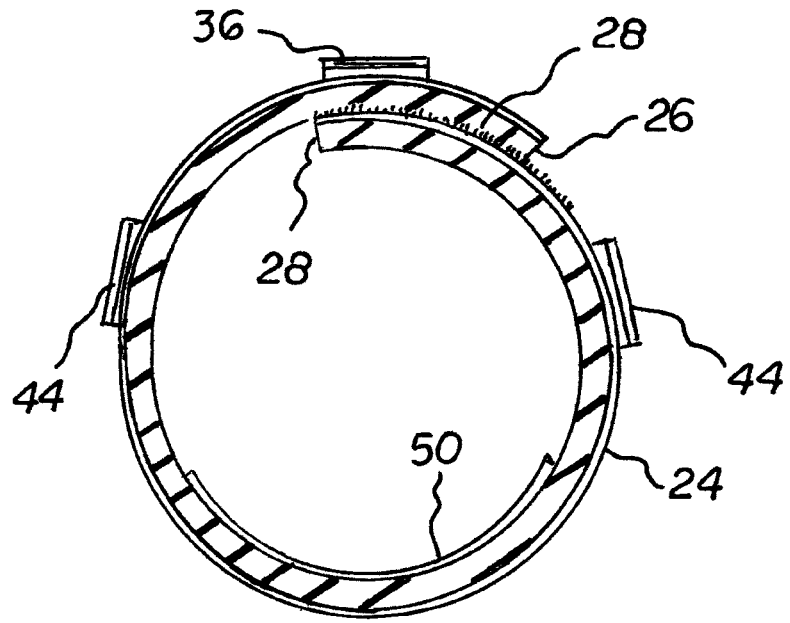
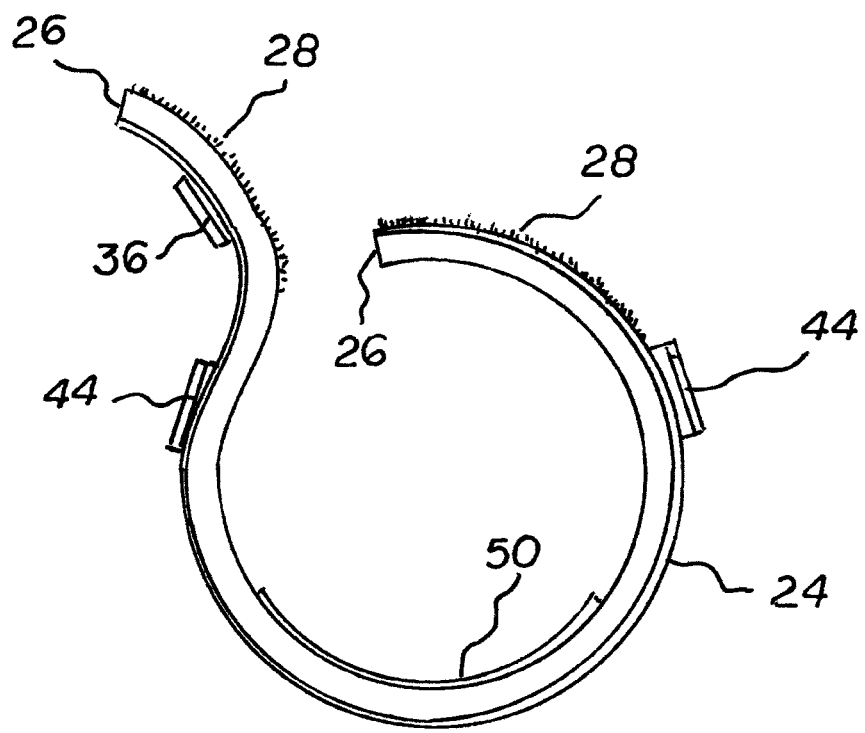
FIG. 6

WINDOWED MUZZLE SYSTEM

RELATED APPLICATION

The present application is a continuation-in-part application of pending U.S. patent application Ser. No. 13/894,772 filed May 15, 2013, the subject matter of which is incorporated herein by reference.

BACKGROUND OF THE INVENTION

1. Field of the Invention

The present invention relates to a cat muzzle system and more particularly pertains to restraining and relaxing a cat during an examination and medical procedure.

2. Description of the Prior Art

The use of animal muzzles is known in the prior art. More specifically, muzzles previously devised and utilized for the purpose of performing examinations and procedures on animals are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, the prior art devices do not describe a cat muzzle system that allows examinations and procedures to be performed in a safe, convenient and economical manner.

In this respect, the cat muzzle system according to the present invention substantially departs from the conventional concepts and designs of the prior art, and in doing so provides an apparatus primarily developed for the purpose of allowing examinations and procedures to be performed in a safe, convenient and economical manner.

Therefore, it can be appreciated that there exists a continuing need for a new and improved cat muzzle system which can be used for the purpose of allowing examinations and procedures to be performed in a safe, convenient and economical manner. In this regard, the present invention substantially fulfills this need.

SUMMARY OF THE INVENTION

In view of the foregoing disadvantages inherent in the known types of muzzles now present in the prior art, the present invention provides an improved cat muzzle system. As such, the general purpose of the present invention, which will be described subsequently in greater detail, is to provide a new and improved cat muzzle system and method which has all the advantages of the prior art and none of the disadvantages.

To attain this, the present invention essentially comprises a muzzle formed of a flexible sheet having a top and a bottom and laterally spaced sides. A central hole is in the muzzle equally spaced from the sides and closer to the bottom than to the top. Two laterally spaced side holes are in the muzzle between the central hole and the sides. A restraint has a generally rectangular configuration with opposed free ends and with fasteners secured to the restraint adjacent to free ends. Attachment elements couple the muzzle and the restraint.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cat muzzle system which has all of the advantages of the prior art muzzles and none of the disadvantages.

It is another object of the present invention to provide a new and improved cat muzzle system which may be easily and efficiently manufactured and marketed.

It is further object of the present invention to provide a new and improved cat muzzle system which is of durable and reliable constructions.

An even further object of the present invention is to provide a new and improved cat muzzle system which is susceptible of a low cost of manufacture with regard to both materials and labor, and which accordingly is then susceptible of low prices of sale to the consuming public, thereby making such cat muzzle system economically available.

Even still another object of the present invention is to provide a cat muzzle system for restraining and relaxing a cat during an examination and a procedure.

Lastly, it is an object of the present invention to provide a new and improved system to restrain and relax a cat while being examined, and to cover portions of a face and mouth of the cat in order to provide protection to a care giver, and to provide the care giver the ability to examine aspects of the face and mouth of the cat, all while the cat is restrained and relaxed, the restraining, relaxing, protecting and examining being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a cat muzzle system constructed in accordance with the principles of the present invention.

FIG. 2 is an enlarged side elevational view taken along circle 2 of FIG. 1.

FIGS. 3 and 4 are front and rear elevational views taken along lines 3-3 and 4-4 of FIG. 1.

FIGS. 5 and 6 are cross sectional views taken along lines 5-5 and 6-6 of FIG. 1.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved cat muzzle system embodying the principles and concepts of the present invention and generally designated by the reference numeral 10 will be described.

The present invention, the cat muzzle system 10 is comprised of a plurality of components. Such components in their broadest context include a muzzle, a restraint and coupling elements. Such components are individually configured and correlated with respect to each other so as to attain the desired objective.

The present invention is a cat restraint/relaxation system 10 adapted to restrain and relax a cat while being examined and to cover portions of a face and mouth of the cat in order to provide protection to a caregiver. The system also functions to provide the caregiver the ability to examine aspects of the face and mouth of the cat while restrained and relaxed. The system so functions to restrain and relax the cat while protecting the cat and care giver. The examining and procedure are therefore done in a safe, convenient and economical manner.

First provided is a muzzle 14. The muzzle is formed of a sheet 16 of a flexible, transparent, inextensible material in a circular configuration. The sheet includes a vertical center line and a horizontal center line. The sheet has a top and a bottom and laterally spaced sides. The sheet has a generally oval hole 18 equally spaced from the sides and closer to the bottom than to the top. The generally oval hole is adapted to provide access to the front teeth and lips of the cat. The sheet also has two laterally spaced rectangular holes 20 laterally spaced between the generally oval hole and the horizontal centerline. The rectangular holes are adapted to provide access to the rear teeth and lips of the cat.

A restraint 24 is next provided. The restraint has a generally rectangular configuration. The restraint is positionable around the neck of the cat in a cylindrical configuration with a generally horizontal axis. The restraint has opposed free ends 26 with hook and loop fastener sections 28 secured to the restraint adjacent to free ends. The hook and loop fastener sections are adapted to be coupled to removably secure the restraint around the neck of the cat. The hook and loop fastener sections are adapted to be uncoupled to remove the restraint from around the neck of the cat.

Provided lastly are attachment elements coupling the muzzle and the restraint. The attachment elements include an inextensible top strip 32. The top strip has a top forward element 34 attached to the muzzle adjacent to the top. The top strip has a top rearward element 36 attached to an upper extent of the restraint. The top strip has a length adjustable top buckle 38 removably coupling the top forward element and the top rearward element.

The attachment elements includes two similarly configured, laterally spaced side strips 40 each having a side forward element 42 attached to the muzzle adjacent to the sides. Each side strip has a side rearward element 44 attached to the restraint at side extents of the restraint. Each side strip has a length adjustable side buckles 46 removably coupling the side forward element and the side rearward element.

The attachment elements also include a bottom patch 50 having a forward edge 52 attached to the muzzle adjacent to the bottom. The bottom patch has a rearward edge 54 attached to a lower extent of the restraint. The bottom patch is fabricated of an elastic material.

The present invention is a muzzle for cats. It is a device that provides protection to a care giver from a restrained cat and also allows the care giver the ability to examiner aspects of the retained cat. There are import features of the invention as follows:

The muzzle around the face reduce the ability of the cat to open its mouth and harm the investigator with its teeth.

Elements of the face that are normally obscured by other muzzles are fully visible.

The surrounding molars may be examined along with the teeth and gums from a window on the muzzle.

A circular opening at the tip of the muzzle allows vision and manipulation of the front lips exposing the canines, gum and incisors. It also allows for administration of medicines and sprays into the cat between the buccal and lingual gingiva.

The clear muzzle over the face allows for better determination of dirt or body fluids on the muzzle once it leaves the cat.

The smooth transparent plastic of the clear muzzle allows for easier cleaning of dirt or body fluids on the muzzle.

The clear muzzle allows a veterinarian to evaluate systemic poisoning, neurological deficits, eye injury, or disease of the eye, that are not possible with existing muzzles that cover the eyes with non-transparent fabric.

The connection of the clear muzzle over the face with the non-transparent portion over the neck is afforded by an adjustable strap. The strap can be tightened to maximize the secure fit of the entire muzzle upon the cat and prevent it from being torn off by the cat.

The reduction of anxiety in the cat is afforded by the non-transparent portion being applied over the neck in an open non-threatening fashion. Closure is then enabled by velcro or other type fasteners placed along the entire dorsal aspect.

Restraint of the cat is accomplished after the non-transparent portion is snugly placed over the neck and is tightly connected to the transparent portion over the cat's face.

A relaxing, stupefying, tranquilizing effect on the cat is often produced by the application of the muzzle and aids in restraint.

A padded fabric used over the non-transparent portion covering the neck increases the tightness of the muzzle and maximizes the mobilization effect.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cat restraint/relaxation system (10) to restrain and relax a cat while being examined and to cover portions of a face and mouth of the cat in order to provide protection to a care giver and to provide the care giver the ability to examine aspects of the face and mouth of the cat while restrained and relaxed, the restraining, relaxing, protecting and examining being done in a safe, convenient and economical manner, the system comprising, in combination:

a muzzle (14) formed of a sheet (16) of a flexible, transparent, inextensible material in a circular configuration with a vertical center line and a horizontal center line, the sheet having a top and a bottom and laterally spaced sides, the sheet having a generally oval hole (18) equally spaced from the sides and closer to the bottom than to the top, the generally oval hole adapted to provide access to the front teeth and lips of the cat, the sheet having two laterally spaced rectangular holes (20) laterally spaced between the generally oval hole and the horizontal centerline, the rectangular holes adapted to provide access to the rear teeth and lips of the cat;

a restraint (24) having a generally rectangular configuration, the restraint being positionable around the neck of the cat in a cylindrical configuration with a generally horizontal axis, the restraint having opposed free ends (26) with hook and loop fastener sections (28) secured to the restraint adjacent to free ends, the hook and loop fastener sections adapted to be coupled to removably secure the restraint around the neck of the cat, the hook and loop fastener sections adapted to be uncoupled to remove the restraint from around the neck of the cat; and attachment elements coupling the muzzle and the restraint, the attachment elements including an inextensible top strip (32) having a top forward element (34) attached to the muzzle adjacent to the top, the top strip having a top rearward element (36) attached to an upper extent of the restraint, the top strip having a length adjustable top buckle (38) removably coupling the top forward element and the top rearward element, the attachment elements including two similarly configured, laterally spaced side strips (40) each having a side forward element (42) attached to the muzzle adjacent to the sides, each side strip having a side rearward element (44) attached to the restraint at side extents of the restraint, each side strip having a length adjustable side buckles (46) removably coupling the side forward element and the side rearward element, the attachment elements including a bottom patch (50) having a forward edge (52) attached to the muzzle adjacent to the bottom, the bottom patch having a rearward edge (54) attached to a lower extent of the restraint, the bottom patch being fabricated of an elastic material.

* * * * *